United States Patent
Arnold et al.

(10) Patent No.: US 11,971,890 B2
(45) Date of Patent: *Apr. 30, 2024

(54) DATABASE MANAGEMENT SYSTEM FOR OPTIMIZING QUERIES VIA MULTIPLE OPTIMIZERS

(71) Applicant: Ocient Inc., Chicago, IL (US)

(72) Inventors: Jason Arnold, Chicago, IL (US); George Kondiles, Chicago, IL (US)

(73) Assignee: Ocient Inc., Chicago, IL (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/806,119

(22) Filed: Jun. 9, 2022

(65) Prior Publication Data

US 2022/0300510 A1  Sep. 22, 2022

Related U.S. Application Data

(63) Continuation of application No. 16/933,174, filed on Jul. 20, 2020, now Pat. No. 11,416,486, which is a (Continued)

(51) Int. Cl.
*G06F 7/00* (2006.01)
*G06F 16/00* (2019.01)
(Continued)

(52) U.S. Cl.
CPC ........ *G06F 16/24542* (2019.01); *G06F 16/21* (2019.01); *G06F 16/23* (2019.01);
(Continued)

(58) Field of Classification Search
None
See application file for complete search history.

(56) References Cited

U.S. PATENT DOCUMENTS

| 5,548,770 A | 8/1996 | Bridges |
| 5,634,011 A | 5/1997 | Auerbach et al. |

(Continued)

OTHER PUBLICATIONS

A new high performance fabric for HPC, Michael Feldman, May 2016, Intersect360 Research.
(Continued)

*Primary Examiner* — Tuan A Pham
(74) *Attorney, Agent, or Firm* — Garlick & Markison; Bruce E. Stuckman; Katherine C. Stuckman

(57) ABSTRACT

A large highly parallel database management system includes thousands of nodes storing huge volume of data. The database management system includes multiple query optimizers for determining low cost execution plans for queries. The database management system is adapted to receive a data query. An execution plan generator component of the database management system generates an initial execution plan for the query. The initial execution plan is fed as input to more than one query optimizers. Each optimizer starts with the initial execution plan, generates alternative execution plans, and determines a satisfactory execution plan that incurs the lowest cost. The database management system compares the selected execution plans by the optimizers and selects one with the lowest cost. The multiple query optimizers run in parallel.

20 Claims, 9 Drawing Sheets

Related U.S. Application Data continuation of application No. 15/991,192, filed on May 29, 2018, now Pat. No. 10,747,765.

(60) Provisional application No. 62/512,248, filed on May 30, 2017.

(51) Int. Cl.
  *G06F 16/21*      (2019.01)
  *G06F 16/23*      (2019.01)
  *G06F 16/2453*    (2019.01)
  *G06F 16/2455*    (2019.01)
  *G06F 16/901*     (2019.01)

(52) U.S. Cl.
  CPC .. *G06F 16/24532* (2019.01); *G06F 16/24545* (2019.01); *G06F 16/2455* (2019.01); *G06F 16/901* (2019.01)

(56) References Cited

U.S. PATENT DOCUMENTS

| | | |
|---|---|---|
| 6,230,200 B1 | 5/2001 | Forecast |
| 6,633,772 B2 | 10/2003 | Ford |
| 7,177,951 B1 | 2/2007 | Dykeman et al. |
| 7,499,907 B2 | 3/2009 | Brown |
| 7,908,242 B1 | 3/2011 | Achanta |
| 7,990,797 B2 | 8/2011 | Moshayedi |
| 9,389,909 B1 | 7/2016 | Langseth |
| 2001/0051949 A1 | 12/2001 | Carey |
| 2002/0010739 A1 | 1/2002 | Ferris et al. |
| 2002/0032676 A1 | 3/2002 | Reiner |
| 2004/0162853 A1 | 8/2004 | Brodersen |
| 2006/0037075 A1 | 2/2006 | Frattura |
| 2006/0268742 A1 | 11/2006 | Chu et al. |
| 2008/0109421 A1 | 5/2008 | Yoo et al. |
| 2008/0133456 A1 | 6/2008 | Richards |
| 2009/0063893 A1 | 3/2009 | Bagepalli |
| 2009/0172191 A1 | 7/2009 | Dumitriu et al. |
| 2009/0183167 A1 | 7/2009 | Kupferschmidt |
| 2010/0082577 A1 | 4/2010 | Mirchandani |
| 2010/0241646 A1 | 9/2010 | Friedman |
| 2010/0274983 A1 | 10/2010 | Murphy |
| 2010/0306188 A1 | 12/2010 | Cunningham |
| 2010/0312756 A1 | 12/2010 | Zhang |
| 2011/0137890 A1 | 6/2011 | Bestgen |
| 2011/0219169 A1 | 9/2011 | Zhang |
| 2012/0109888 A1 | 5/2012 | Zhang et al. |
| 2012/0151118 A1 | 6/2012 | Flynn |
| 2012/0185866 A1 | 7/2012 | Couvee |
| 2012/0254252 A1 | 10/2012 | Jin |
| 2012/0311246 A1 | 12/2012 | McWilliams |
| 2013/0091122 A1 | 4/2013 | Salch |
| 2013/0332484 A1 | 12/2013 | Gajic |
| 2014/0047095 A1 | 2/2014 | Breternitz |
| 2014/0136510 A1 | 5/2014 | Parkkinen |
| 2014/0188841 A1 | 7/2014 | Sun |
| 2014/0236921 A1 | 8/2014 | Belknap |
| 2014/0280037 A1 | 9/2014 | Petride |
| 2015/0039712 A1 | 2/2015 | Frank et al. |
| 2015/0205607 A1 | 7/2015 | Lindholm |
| 2015/0244804 A1 | 8/2015 | Warfield |
| 2015/0248366 A1 | 9/2015 | Bergsten |
| 2015/0278306 A1 | 10/2015 | Cheng |
| 2015/0293966 A1 | 10/2015 | Cai |
| 2015/0310045 A1 | 10/2015 | Konik |
| 2015/0324432 A1* | 11/2015 | Gangloor ............ G06F 16/2453 707/718 |
| 2016/0034547 A1 | 2/2016 | Lerios |
| 2016/0350375 A1* | 12/2016 | Das .................. G06F 16/2456 |
| 2017/0116271 A1 | 4/2017 | Ziauddin |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Angskun T., Bosilca G., Dongarra J. (2007) Self-healing in Binomial Graph Networks. In: Meersman R., Tari Z., Herrero P. (eds) On the Move to Meaningful Internet Systems 2007: OTM 2007 Workshops. OTM 2007. Lecture Notes in Computer Science, vol. 4806. Springer, Berlin, Heidelberg.

Big Table, a NoSQL massively parallel table, Paul Krzyzanowski, Nov. 2011, https://www.cs.rutgers.edu/pxk/417/notes/contentlbigtable_html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplified Data Processing on Large Clusters, OSDI 2004, Jeffrey Dean and Sanjay Ghemawat, Google, Inc., 13 pgs.

Remote Direct Memory Access Transport for Remote Procedure Call, Internet Engineering Task Force (IETF), T. Talpey, Request for Comments: 5666, Category: Standards Track, ISSN: 2070-1721, Jan. 2010.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

T. Angskun, G. Bosilca, B. V. Zanden and J. Dongarra, Optimal Routing in Binomial Graph Networks, Eighth International Conference on Parallel and Distributed Computing, Applications and Technologies (PDCAT 2007), Adelaide, SA, 2007, pp. 363-370.

\* cited by examiner

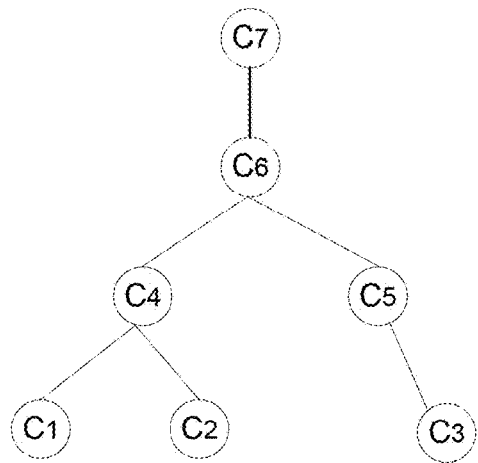
FIG. 2
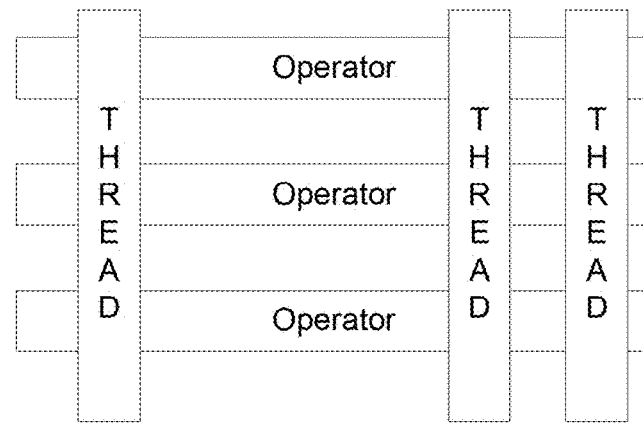
FIG. 3
FIG. 4
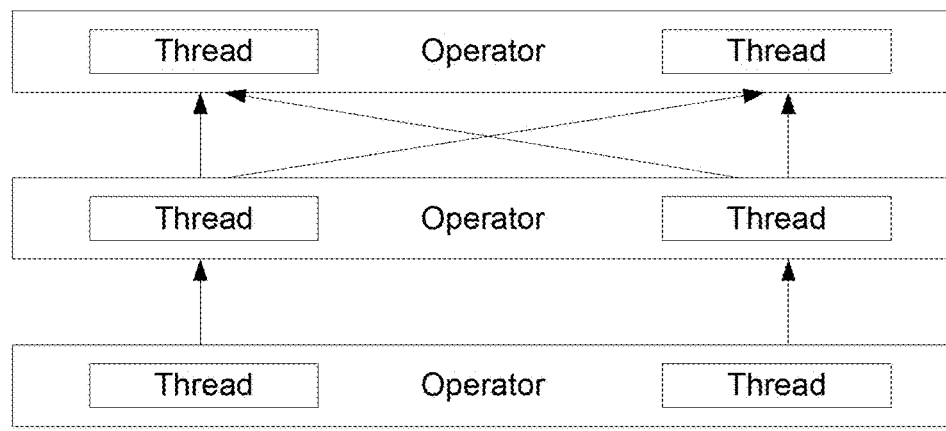

Select <columns>                                    700

From <tables>

[Where <predicate – boolean conditions>]

[Group By <columns>]

[Having <predicate>]

[Order By <columns>]

FIG. 7

| $C_1$ | $C_2$ | $C_3$ |
|---|---|---|
| a | b | a*b |

FIG. 8

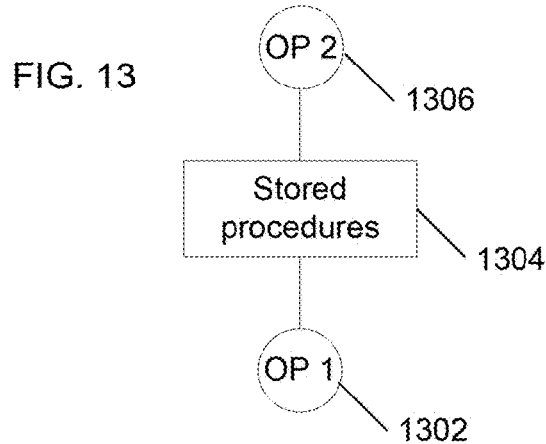

FIG. 13

1402 — CREATE MODEL my_model TYPE SIMPLE LINEAR REGRESSION ON (SELECT x, y FROM training_data)

1404 — SELECT x, actual, estimated, actual - estimated as error FROM (SELECT x, y as actual, my_model(x) as estimated FROM validation_data) a;

1406 — with build_model_over_this(x, y) as (SELECT x, y FROM training_data) select a, b, double(1.0 - (((((sumy2 - ((2.0 * a) * sumxy)) - ((2.0 * b) * sumy)) + ((a * a) * sumx2)) + (((2.0 * a) * b) * sumx)) + ((b * b) * n)) / (n * varp)) as coeff from (select double(((sumx * sumy) - (n * sumxy)) / ((sumx * sumx) - (n * sumx2))) as a, double(((sumx2 * sumy) - (sumx * sumxy)) / ((n * sumx2) - (sumx * sumx))) as b, sumx, sumy, sumx2, sumy2, sumxy, n, varp from (select sum(x) as sumx, sum(y) as sumy, sum(x * y) as sumxy, sum(x * x) as sumx2, sum(y * y) as sumy2, count(*) as n, variancep(y) as varp from (select x, y from build_model_over_this where x is not null and y is not null)))

FIG. 14

DATABASE MANAGEMENT SYSTEM FOR OPTIMIZING QUERIES VIA MULTIPLE OPTIMIZERS

CROSS REFERENCE TO RELATED APPLICATIONS

The present U.S. Utility patent application claims priority pursuant to 35 U.S.C. § 120 as a continuation of U.S. Utility application Ser. No. 16/933,174, entitled "System and Method for Optimizing Large Database Management Systems with Multiple Optimizers", filed Jul. 20, 2020, which is a continuation of U.S. Utility application Ser. No. 15/991,192, entitled "System and Method for Optimizing Large Database Management Systems with Multiple Optimizers", filed May 29, 2018, issued as U.S. Pat. No. 10,747,765 on Aug. 18, 2020, which claims priority pursuant to 35 U.S.C. § 119(e) to U.S. Provisional Application No. 62/512,248, entitled "System and Method for Optimizing Large Database Management Systems", filed May 30, 2017, all of which are hereby incorporated herein by reference in their entirety and made part of the present U.S. Utility patent application for all purposes.

U.S. Utility application Ser. No. 15/991,192 is related to U.S. Provisional Application No. 62/403,328, entitled "Application Direct Access To Network RDMA Memory," filed Oct. 3, 2016; U.S. Provisional Application No. 62/403,231, entitled "Highly Parallel Database Management System," filed Oct. 3, 2016; U.S. Provisional Application No. 62/433,901, entitled "Efficient Database Management Systems," filed Dec. 14, 2016; U.S. Provisional Application No. 62/433,919, entitled "Use Of A Designated Leader To Manage A Cluster Of Nodes In A Database Management System," filed Dec. 14, 2016; and U.S. Provisional Application No. 62/480,601, entitled "Database Management System Using Hybrid Indexing List And Hierarchical Query Processing Architecture," filed Apr. 3, 2017, all of which are hereby incorporated by reference in their entirety.

FIELD OF THE DISCLOSURE

The present invention generally relates to a system and method for organizing and managing large volume of data, and more particularly relates to a system and method for optimizing large database management systems. More particularly still, the present disclosure relates to a system and method for optimizing queries managing data of large database management systems.

DESCRIPTION OF BACKGROUND

Structured Query Language ("SQL") is a database access language for managing data stored in a database. SQL statements are widely used for retrieving data from, storing data into and modifying data stored in the database, such as a relational database management system ("RDBMS"). An illustrative SQL query is shown below:

SELECT * FROM users WHERE name='Captain Nemo' ORDER BY id ASC LIMIT 1

When an SQL statement is processed by a database system, the SQL statement is parsed and translated into an abstract syntax tree representing the SQL query. Each node of the abstract syntax tree denotes a construct of the SQL statement. An illustrative abstract syntax tree of the SQL statement above is shown in FIG. 1. Based on the abstract syntax tree, a query optimizer component determines an execution plan of the SQL query. The execution plan is desired to be the most efficient way and path to retrieve or update data stored in the database. The efficiency is usually measured by how fast the SQL query is executed and how much resources (such as CPU cycles and I/O operations) the execution uses. Oftentimes, a query optimizer generates more than one execution plan and chooses the one with the lowest cost. Once an execution plan is selected, the SQL query is executed according to the execution plan by the database system's engine.

Each step of an execution plan is usually estimated to determine the amount of time it takes to execute the step. The estimated time is also termed as the estimated cost of the step. The sum of the estimated costs of the steps of the execution plan is the estimated cost of the execution plan. For example, an execution plan for the SQL query above may include the steps of selecting rows with "Captain Nemo" as name, sorting the selected rows by id, and selecting the top row of the sorted rows. The execution plan cost is further illustrated by Formula 1 below:

$C_{plan} = \Sigma_1^N C_i$, $C_{plan}$ is the cost of the execution plan and $C_i$ is the execution cost of a step of the execution plan. The different Cis are also illustrated in FIG. 2. Each execution step corresponds to one or more operators. Executing a step means performing the one or more operators by a thread or multiple threads. Operators indicate operations on one or more rows in a database, intermediate results during the processing of an SQL query, etc. For ease of illustration herein, each execution step is said to correspond to one operator.

To process SQL queries faster, multithreading has been proposed. As shown in FIG. 3, multiple threads each perform all the operators. For instance, each thread operates on one or more rows of data and performs all necessary operators to produce part or all of the desired results. Alternatively, as shown in FIG. 4, one or more threads are dedicated to perform one and only one operator. The parallelism shown in FIGS. 3-4 improves the performance on SQL queries. However, it also utilizes additional system resources, such as central processing unit ("CPU") cycles, memory, etc. Furthermore, due to data dependency between operators and other issues in parallel processing, the performance offered by the multithreading pipelines of FIGS. 3-4 is not linear. For example, two threads do not necessarily reduce the execution time by half.

Other query optimization techniques, such as rule based optimization ("RBO") and cost based optimization ("CBO") have been proposed as well. Generally, query optimization is about determining an execution plan that runs faster than other execution plans and consumes system resources (such as memory) below certain thresholds. For example, the execution plan 500 shown in FIG. 5 is less desirable than the execution plan 600 shown in FIG. 6 for the SQL query 700 shown in FIG. 7. In this particular case, the difference between the execution plan 600 and the execution plan 500 is that execution plan 600 has converted the Cartesian product operation 510 into a join operation 610. In general, join operations have much lower costs that Cartesian product operations.

Since a significant amount of data may be retrieved from data storage disk drives of the database system, the access speed of such drives should be considered in query optimization. Furthermore, the amount of data retrieved from data storage disk drives and accessed in memory is another important factor in query optimization. Accordingly, there is a need for a database system that optimizes queries based on the amount of data involved and the storage drive disk access speed.

Furthermore, since a large amount of data may have to be retrieved from different nodes in a large database system, query optimization to reduce the amount of communications required between nodes is desired. In addition, the building of machine learning data models based on data stored in a database is oftentimes desired. Data modeling usually involves significant amount of data and computation. Query optimization of data modeling is thus desirable. Such optimization is not offered in conventional database systems since they provide data modeling as library calls (such as stored procedures) that cannot be optimized.

Objects of the Disclosed System, Method, and Apparatus

Accordingly, it is an object of this disclosure to provide a large parallel database management system optimizing SQL queries at a lower layer.

Another object of this disclosure is to provide a large parallel database management system optimizing SQL queries at a lower layer to reduce the amount of data read from storage drives.

Another object of this disclosure is to provide a large parallel database management system optimizing SQL queries at a lower layer to reduce the amount of processing that must be done to the data.

Another object of this disclosure is to provide a large parallel database management system optimizing SQL queries based on column cardinality and column distribution to reduce the cost of generating the requested result set.

Another object of this disclosure is to provide a large parallel database management system optimizing SQL queries based on column cardinality determined using Bloom filters.

Another object of this disclosure is to provide a large parallel database management system optimizing SQL queries based on column distribution determined using kernel density estimation.

Another object of this disclosure is to provide a large parallel database management system optimizing a query by selecting a satisfactory execution plan of the query using particle swarm optimization.

Another object of this disclosure is to provide a large parallel database management system utilizing multiple SQL query optimizers simultaneously to determine a satisfactory execution plan of a query.

Another object of this disclosure is to provide a large parallel database management system optimizing a query by selecting a satisfactory execution plan of the query using both particle swarm optimization and heuristic optimization.

Another object of this disclosure is to provide a large parallel database management system optimizing SQL queries based on computer configurations of database system nodes.

Another object of this disclosure is to provide a large parallel database management system optimizing SQL queries based on network throughput between database system nodes.

Another object of this disclosure is to provide a large parallel database management system supports SQL queries incorporating data modeling syntax.

Another object of this disclosure is to provide a large parallel database management system supports integrated SQL queries and data modeling syntax that allow optimization of data modeling.

Another object of this disclosure is to provide a large parallel database management system supports integrated SQL queries and data modeling syntax that allow optimization of data modeling to reduce execution time and the amount of data accessed.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a system and method for optimizing SQL queries executed by a database management system. The database management system includes a large number (such as thousands or more) of computer nodes operating in parallel. Each node stores some amount of data. The database system includes an SQL query optimizer operating at a lower layer for reducing the amount of data read from one or more nodes, and for reducing the amount of time required to perform the requested processing on the data. The reduced read time and processing time decreases the elapsed time and system resources to execute the query. The SQL query optimization engine uses column cardinality and column distribution statistics based on a subset of database records for determining an optimal method for performing the requested data processing operations. The column cardinality is determined using a Bloom filter and an estimate of frequency of frequencies information based on the sampled subset of database records. The column distribution is also created based on sampled rows using kernel density estimation.

Further in accordance with various embodiments, the present teachings provide a system and method for optimizing SQL queries executed by a database management system. The SQL query optimizer receives a query, creates a plurality of execution plans for the query, and performs a particle swarm optimization to determine a satisfactory execution plan for executing the query. During the particle swarm optimization process, the SQL optimization engine generates new plans from existing plans by determining a moving direction and a moving distance in the search space of all possible equivalent plans. Periodically, the optimization process is checkpointed to determine whether optimization should continue or whether a satisfactory execution plan has been found.

Further in accordance with various embodiments, the present teachings provide a system and method for optimizing SQL queries executed by a database management system. The optimizer factors in the computer configurations and network throughput for each node. These factors are used to determine the time cost of an execution step in an execution plan.

Further in accordance with various embodiments, the present teachings provide a system and method for optimizing SQL queries executed by a database management system. The optimization system includes multiple optimizers. More than one optimizer is executed at the same time to optimize an SQL query. The best result from the more than one optimizer is then selected as the execution plan for executing the query. In particular, the database management system includes a query execution plan generator, a first query optimizer, and a second query optimizer. The query execution plan generator creates an initial execution plan of a query received by the database management a query. The first query optimizer is adapted to receive the initial execution plan as an input and determine a first satisfactory execution plan of the query. Running in parallel with the first optimizer, the second query optimizer is adapted to receive the initial execution plan as an input and determine a second satisfactory execution plan of the query. The database management system is further adapted to compare the first satisfactory execution plan against the second satisfactory execution plan to select a lower cost execution plan from the first satisfactory execution plan and the second satisfactory execution plan. The database management system then executes the selected lower cost execution plan of the data query. The first satisfactory execution plan cab be different from or same as the second satisfactory execution plan. The first query optimizer and the second query optimizer are executed concurrently to determine the first satisfactory execution plan and the second satisfactory execution plan respectively.

Further in accordance with various embodiments, the present teachings provide a system and method for optimizing SQL queries executed by a database management system. The optimization system supports SQL queries integrated with machine learning data models. The integrated SQL statements allow syntax for creating and applying data models. In the integrated syntax, data models can be applied in any context in which an SQL scalar function call is valid. With data modeling integrated in SQL statements, optimization on the data modeling queries is thus possible in the new database system. Data modeling usually involves large quantity of data and computation. Optimizing data modeling queries like other SQL queries significantly reduced the time to create and/or evaluate data models.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 2 is an illustrative tree structure depicting execution steps of an execution plan in accordance with this disclosure.

FIG. 3 is a simplified block diagram illustrating a multi-thread based query processing architecture in accordance with this disclosure.

FIG. 4 is a simplified block diagram illustrating a multi-thread based query processing architecture in accordance with this disclosure.

FIG. 7 is a simplified diagram illustrating the structure of an SQL query block in accordance with this disclosure.

FIG. 8 is a simplified table illustrating columns and extended columns in accordance with this disclosure.

FIG. 13 is a simplified flowchart depicting a process by which conventional database system supports data modeling in accordance with this disclosure.

FIG. 14 shows three illustrative SQL statements integrating data modeling syntax in accordance with this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
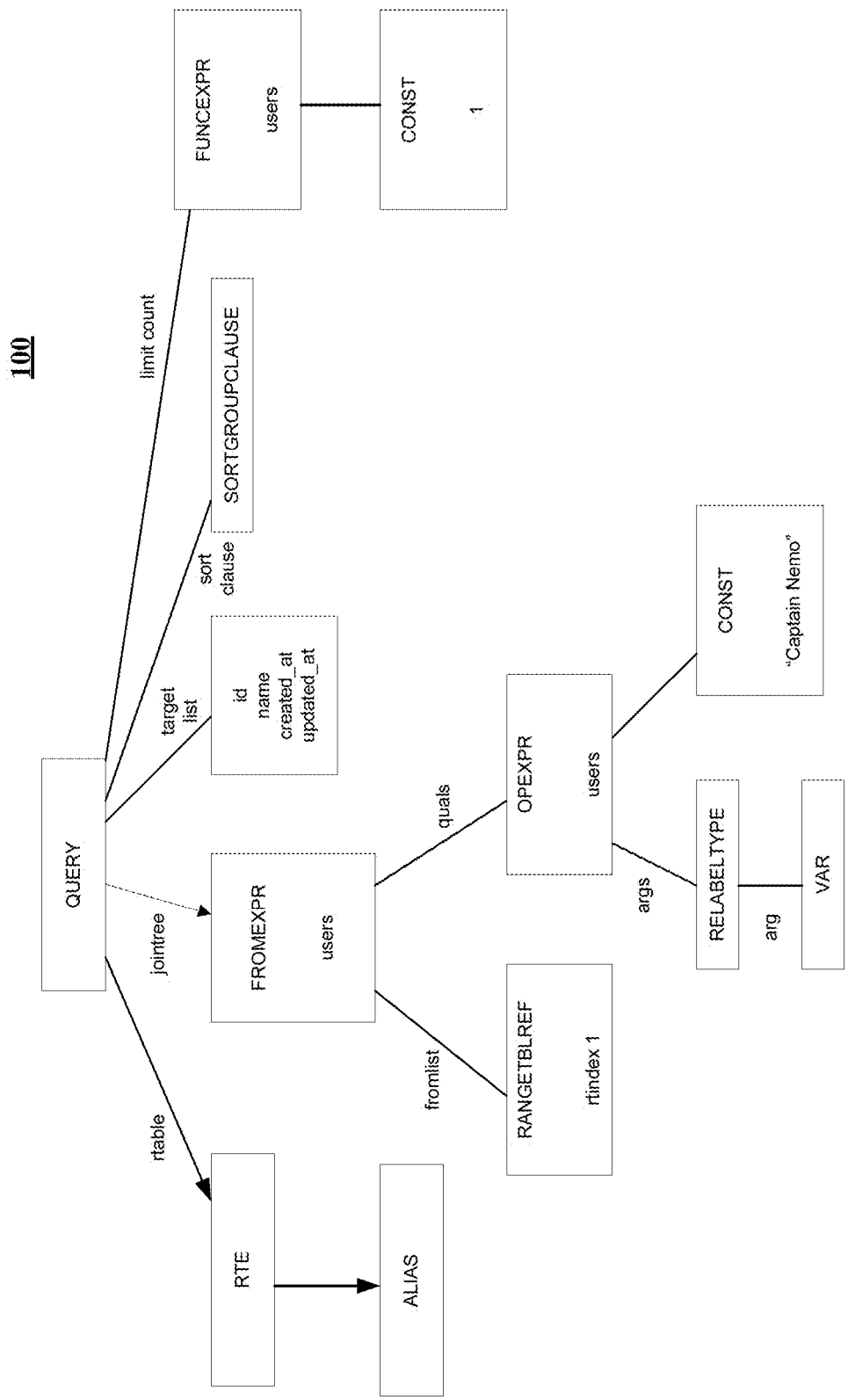
FIG. 1 is an illustrative tree structure depicting an abstract syntax tree of an SQL statement in accordance with this disclosure.
Figure 5:
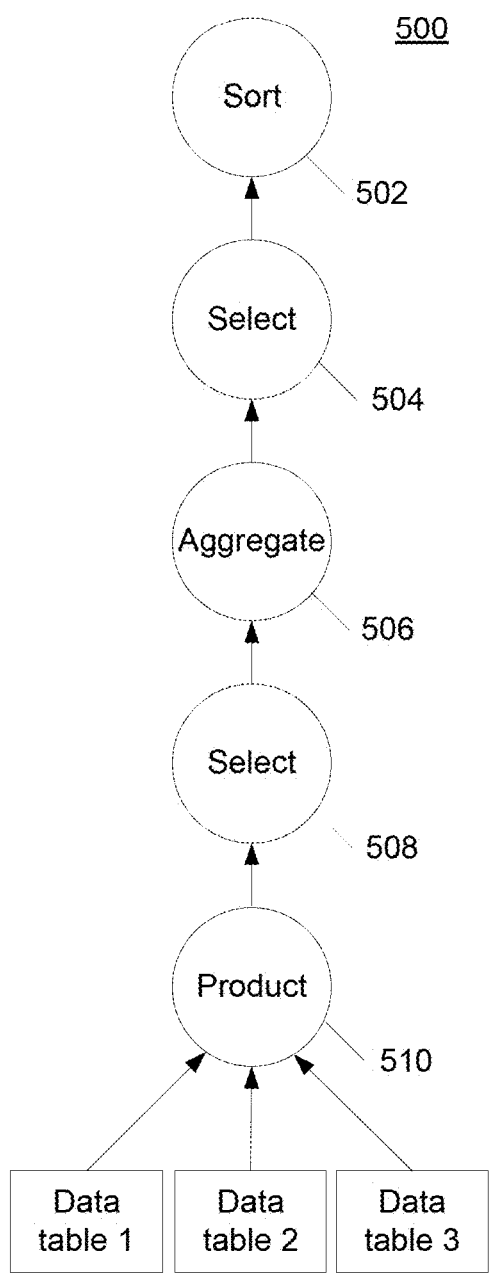
FIG. 5 is a simplified flowchart depicting an execution plan of an SQL query in accordance with this disclosure.
Figure 6:
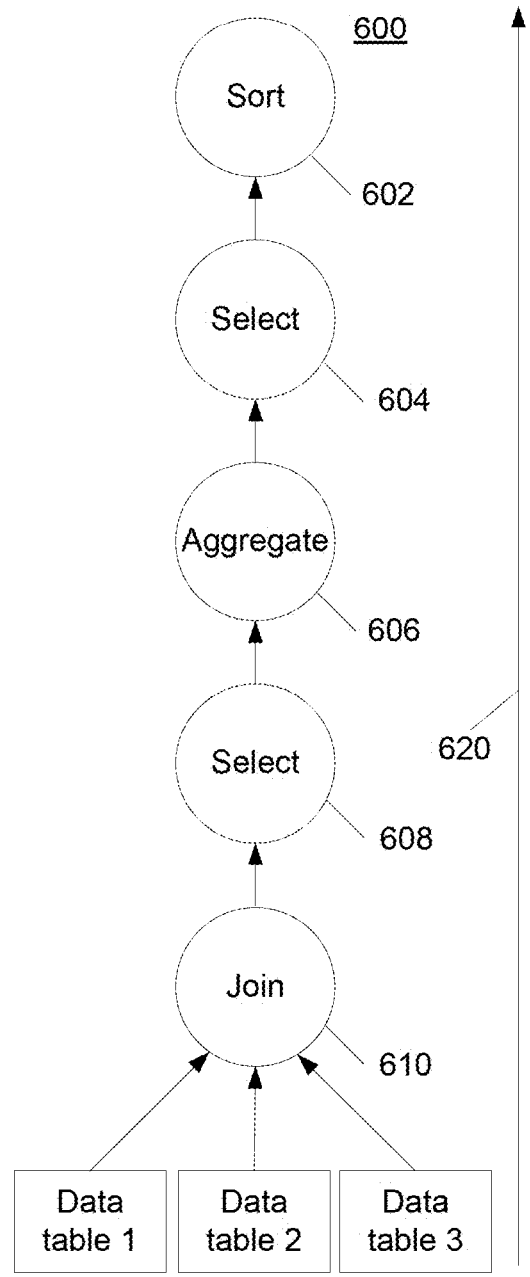
FIG. 6 is a simplified flowchart depicting an execution plan of an SQL query in accordance with this disclosure.

Referring now to FIG. 6, conventional query optimization focuses on the operators 610, 608, 606, 604 and 602 along the dataflow direction 620. Assume that the filtering condition represented by 608 involves the conjunction of several SQL predicates. The order in which these individual predicates are evaluated will make a substantial difference on the execution cost in the case where the number of rows to process is large. Additionally, in a multi-node database system, there are numerous different ways to perform operations 606 and 602, which will have vastly different costs. Even if there is perfect information about the cost of performing these operations in all the various possible ways, the number of possible combinations quickly becomes enormous, and thus it is practically impossible to directly compute the costs of all possible alternatives (collectively referred to herein as search space). A query optimizer requires a method of finding a satisfactory execution plan in the search space without using exhaustive searching. Particle swarm optimization, set forth below, is a new approach to finding a satisfactory execution plan in this large search space.

It is also very challenging to even create good estimates of the costs of the various options. The cost of an operator depends on a number of factors such as available CPU resources, amount of memory available, memory bandwidth, available network bandwidth, number of input rows, size of input rows, number of output rows, size of output rows, etc. The relationship between these variables is operator dependent. However, for a given operator, if the values of some of the variables are known, at least a good estimate of the values of the other variables can be created. Therefore, to create good cost estimates for the various operations, good estimates for a sufficient number of these variables are necessary. As further set forth below, estimates for variables that represent performance characteristics of the database system can be created by directly analyzing system performance.

The rest of the variables have to be estimated from the data itself. In general, it suffices to have estimates of the number of rows in each table, the average length of the rows in each table, the column cardinality of each column in each table, and the column distribution of each column in each table. The number of rows and the average length of the rows in each table are trivial to estimate. The present teachings disclose new approaches to estimate the column cardinality of each column, and the column distribution of each column in each table. Column cardinality is defined as the number of distinct values in the data for a particular column.

When a random sample without replacement of n rows from a set of N rows is taken, the exact number of distinct values of a particular column within the sample can then be easily determined. As used herein, d stands for the number of distinct values within the sampled set of n rows and D stands for the number of distinct values within the entire set of N rows for a particular column. The N rows are, for example, all the rows of a particular table within a database. For the sample, the exact frequency of frequencies information can also be easily determined.

Frequency of frequencies, denoted $f_i$, represents a list of frequencies. $f_1$ is the number of distinct values within a particular column that appear only 1 time in the sampled rows; $f_2$ is the number of distinct values of the column that appear only 2 time in the sampled rows; $f_3$ is the number of distinct values of the column that appear only 3 time in the sampled rows; and so on. Accordingly, d is the sum of all the $f_i$, i.e., $$d=\Sigma_1^M f_i$$

In addition, $n=\Sigma_1^M i*f_i$

To optimize SQL query processing, the present teachings estimate the value of D, i.e., the column cardinality for the whole set of size N. D requires n, N, d, and f as input. f stands for the frequency of frequencies, such as $f_1$ and $f_2$. In other words, D=g(n, N, d, f) and g is a function. When N is small enough, exact values for all these input parameters can be computed and a good estimation of D can be obtained. In accordance with the present teachings, numerous estimates of disjoint sets are combined to produce an estimate for a larger set. For instance, given n1, N1, d1, and f1 based on sampling n1 rows out of some set of N1 rows; and also given n2, N2, d2, and f2 based on sampling n2 rows out of a disjoint set of N2 rows, n3, N3, d3, and f3 representing the combined set of N1+N2 rows are then created. g(n3, N3, d3, B) is then used to calculate D3.

It should be noted that N3=N1+N2 and n3=n1+n2. Exact computation of d and f becomes less feasible as estimates are combined to create new estimates for larger and larger sets. Therefore, a way of taking two estimates of d (d1 and d2) and creating the combined estimate d3 is desired. Likewise, a method for taking estimates of f1 and f2 and creating a new combined estimate B is needed.

To combine estimates of d, instead of storing d, a Bloom filter is stored. A Bloom filter is a probabilistic data structure that can be used to approximate the answers to set membership questions. In accordance with the present teachings, a Bloom filter is used to know for sure if a value is one that has never seen before (and therefore a new distinct value). A Bloom filter can also be used to estimate the number of values that were distinct. When processing a set of samples, the bits of the Bloom filter are turned on for all of the samples. When two sets of samples are combined, bits of the two corresponding Bloom filters can be logically ORed to generate a new combined Bloom filter. The value of d3 can then be computed from the new combined Bloom filter using the formula below.

To calculate d from a Bloom filter, Formula 2 is then used: $d=-(m/k)*\ln[1-(X/m)]$, m is the number of bits (i.e., length) of the Bloom filter's bit array, k is the number of hash functions used for the Bloom filter, and X is the number bits of the bit array that are set to value 1. Formula 2 is also known as Swalmdass-Baldi formula.

Next, a procedure for combining two estimates of frequency of frequencies information to create a new combined estimate is performed. Prior to performing the combination, the following facts are known:

$$d1=\Sigma_1^\infty f_{1i} => -(m/k)*\ln[1-(X1/m)]=\Sigma_1^\infty f_{1i}$$

$$d2=\Sigma_1^\infty f_{2i} => -(m/k)*\ln[1-(X2/m)]=\Sigma_1^\infty f_{2i}$$

$$n1=\Sigma_1^\infty i*f_{1i}$$

$$n2=\Sigma_1^\infty i*f_{2i}$$

The Bloom filters are also combined to generate a combined Bloom filter, whose "ON" bits are represented by X3. The system of equations for all the $f_{3i}$ are then solved.

$$-(m/k)*\ln[1-(X3/m)]=\Sigma_1^\infty f_{3i}$$

$$n1+n2=\Sigma_1^\infty i*f_{3i}$$

The system is under-determined, that is it has more variables than it does equations. Therefore, additional constraints are applied.

For all i, $f_{3i}>=0$.

If $a_1$ is the smallest i such that $f_{1i}$ is non-zero and $b_1$ is the largest I such that $f_{1i}$ is non-zero, then For all i less than $\min(a_1, a_2)$, $f_{3i}=0$ For all i greater than b1+b2, $f_{3i}=0$ For all m, $\Sigma_m^\infty i*f_{3i} >= \Sigma_m^\infty i*f_{2i}+\Sigma_m^\infty i*f_{1i}$ At this point, the system may still be underdetermined, meaning that there is more than one solution. In that event, the first solution that was found is then used.

A column distribution is represented by, for example, a probability density function ("PDF"). For a table with a single column, a one dimensional probability density function is used. For tables with multiple columns, a multi-variate probability density function is used to describe data distribution of the columns. However, for a set of sampled data, only a finite number of data values are known. Accordingly, kernel density estimation ("KDE") is used to estimate a corresponding probability density function. The benefit of using a single multi-variate PDF instead of multiple one-dimensional PDFs is that a multi-variate PDF also captures covariance between columns. In kernel density estimation, there is uncertainty about data. This is referred to in KDE as the bandwidth. Each dimension has its own bandwidth. The initial bandwidth for each dimension is based on the number of samples, the number of dimensions, and the variance of the data for each dimension.

Just as with column cardinality estimation, it is desirable to create new PDFs by combining existing PDFs for disjoint subsets of the data. This provides a way to update the PDF representing an entire table without resampling the entire table when new data is added. Depending on the number of samples involved, this combination procedure may just be a merging of the samples and a recalculation of the bandwidths or it might involve sampling the samples and recalculating the bandwidth.

However, it's not good enough to have a PDF representing the distribution of all the data in all the columns of a table. The PDF representing the distribution of the data at the output of each operator in the execution plan has to be approximated. For example, if half of the data has col1='A' (meaning the value of column 1 is 'A'), half has col1='B', col2 is always 1 when col1 is 'A', and col2 is always 2 when col1 is 'B', then the PDF representing the output of filtering to only keep the rows where col1='A' should have a zero percent probability (or very close to zero) of having any rows where col2=2. However, the original PDF indicates that the probability of a row having col2=2 is 50%. It is thus clear that each operator changes the PDF; and the new PDFs representing the output of each operator have to be approximated. Generating approximated PDFs thus has to be performed for all types of operators including selection (filtering), projection, aggregation, joins, extension, etc. It should be noted that extension actually creates a new column via calculations on existing columns. For example, FIG. 8 shows a new column (column 3) that is calculated as the product of columns 1 and 2.

Since the bandwidth for each dimension of the PDF needs to be treated as an uncertainty, appropriate uncertainty propagation rules have to be applied when extension operations are performed. There are many such applicable rules. A few examples are given below, where e(column1) represents the bandwidth of column 1.

$$e(\text{column 1} + \text{column 2}) = e(\text{column 1}) + e(\text{column 2})$$

$$e(a*\text{column 1}) = a*e(\text{column 1})$$

$$e(a^{\text{column 1}}) = |a^{ln(a)*e(\text{column 1})}|$$

Bandwidth must be represented as an absolute uncertainty and not as a relative uncertainty. In some cases, there is no exact expression representing absolute uncertainty for a given calculation. In such cases, the bandwidth is bound via other measures. For example, a derivative bounding below is applied:

$$e(\sin(\text{column 1})) <= e(\text{column 1}) * \max(|\cos(x)|) = e(\text{column 1}) \text{ is a true statement since the derivative of } \sin(x) = \cos(x)$$

As an additional example, a min/max bounding below is applied:

$$e(\sin(\text{column1})) <= \max(\sin(x)) - \min(\sin(x)) = 2$$

As a further example, a combined bounding below is applied, where the bandwidth is bound by the smaller value of derivative bounding and min/max bounding.

$$e(\sin(\text{column1})) <= \min(e(\text{column1}), 2)$$

Figure 9:
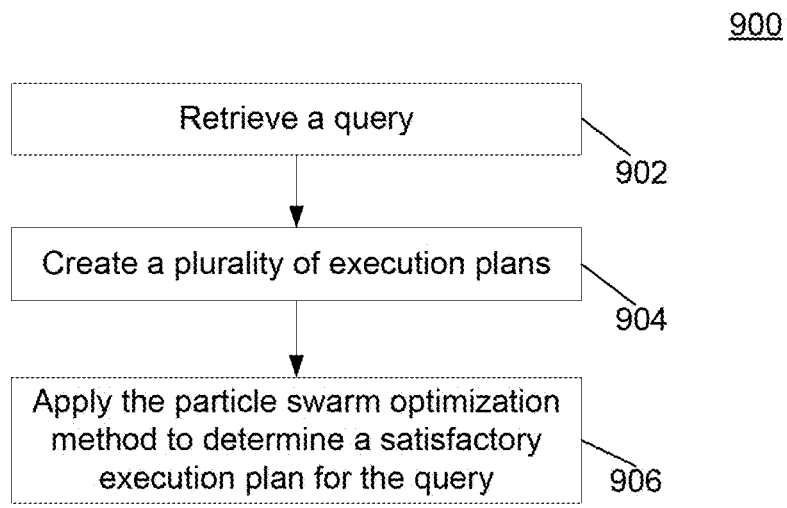
FIG. 9 is a simplified flowchart depicting a process by which a database system optimizes an SQL query using particle swarm optimization in accordance with this disclosure.

Referring now to FIG. 9, a flowchart depicting a process by which a database system performs SQL query optimization is shown and generally indicated at 900. The SQL query optimization process 900 applies the Particle Swarm Optimization ("PSO") method in determining a desirable execution plan for a query. The goal of the optimization process 900 is that the time cost of selecting a satisfactory execution plan is less than the time saved in executing the selected execution plan rather than a different execution plan, such as an execution plan determined without application of the process 900. In other words, the goal is that the time gain in the query execution after the execution plan optimization is more than the optimization cost.

At 902, a query optimization engine receives an SQL query, such as the illustrative SQL query below:

select o_orderpriority, count(*) as order_count from tpch.orders where o_orderdate>=date('1993-07-01') and o_orderdate<date('1993-07-01')+months(3) group by o_orderpriority order by o_orderpriority The query optimization engine can be implemented as, for example, a computer software program written in the computer programming language C++. At 904, the query optimization engine creates a plurality of execution plans. An illustrative execution plan for the illustrative SQL query above is shown in Appendix A filed herewith. The plurality of execution plans are candidate solutions to the problem of selecting a satisfactory execution plan for the SQL query. At 906, the query optimization engine applies the PSO analysis to identify a satisfactory execution plan for executing the SQL query by improving the candidate execution plans within the search space of possible execution plans for the query. An illustrative intermediate execution plan generated during the PSO optimization and a satisfactory execution plan produced from the PSO analysis the illustrative query above are shown in Appendixes B and C respectively.

Execution plans are particles in the PSO analysis. For example, in the operation below, with a transformation $X_5$ on node 4 ($N_4$), the execution plan $P_1$ moves to and becomes execution plan $P_2$.

$$P_1 \to X_5 N_4 \to P_2 \to X_3 N_4 \to P_3$$

With a transformation $X_3$ on node $N_4$, the execution plan $P_2$ becomes execution plan $P_3$. The execution plan $P_1$ at the starting point of the moving path is a candidate execution plan created at 904. As an additional illustrative example, the execution plans $P_1$ and $P_2$ are:

$$P_1 = X_5 N_4 X_3 N_1 X_1 N_2$$

$$P_2 = X_3 N_4 X_3 N_1 X_2 N_6$$

Assuming that $X_5 = X_3^{-1}$ (meaning that the transformation $X_5$ is the reverse transformation of the transformation $X_3$), the direction to move from the execution plan $P_2$ to the execution $P_1$ is: $X_5 N_4 X_5 N_4 X_1 N_2 X_2^{-1} N_6$. This is because starting from $P_2$ and applying this sequence of transformations lead back to $P_1$. Moreover, the distance between P2 and P1 is defined as the number of transformations in the direction. In the example above, the distance between P2 and P1 is 4.

A transformation is defined as modification that can be applied to an operator tree that will generate a new operator tree that produces the same result set as the original operator tree. For example, to return rows where year >=2010 and year <=2015, one possible plan is to filter out the rows where year <2010 first and then filter out the rows where year >2015. Another possible plan is to execute these two filtering operations in the opposite order. Both plans generate the same result set and there is a transformation defined that changes the order of filters. A database system can include tens of different transformations defined over tens of different operator types. The number of different transformations and the number of different operator types can grow and vary.

Figure 10:
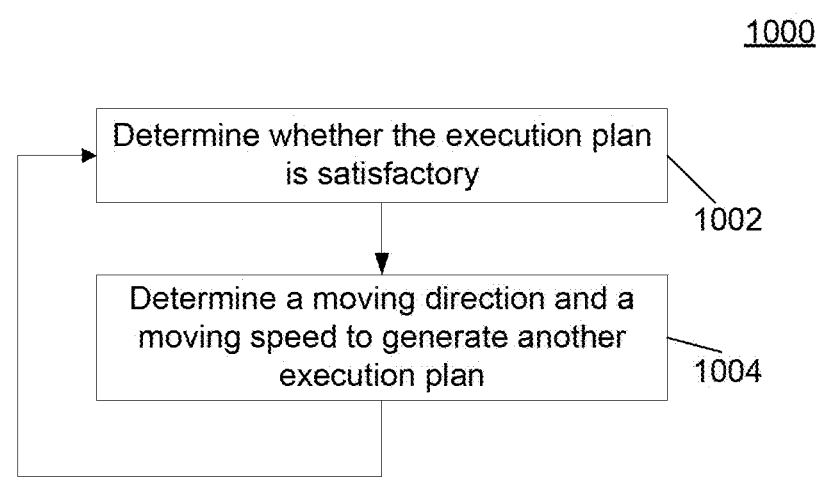
FIG. 10 is a simplified flowchart depicting a process by which a database system searches a satisfactory execution plan of an SQL query in accordance with this disclosure.

The movement from one execution plan to another in the search space for identifying a satisfactory execution plan is further illustrated by reference to FIG. 10. Referring to FIG. 10, a flowchart depicting a process by which the query optimization engine determines a satisfactory execution plan based on PSO analysis is shown and generally indicated at 1000. At 1002, for a particular execution plan, the query optimization engine determines whether it is a satisfactory execution plan. If so, this execution plan is then a selected satisfactory execution plan and the process 900 and 1000 are deemed to have accomplished their respective goals. Otherwise, at 1004, the query optimization engine determines a moving direction and a speed to another execution plan that is, for example, in the current best region. In one implementation, the speed at which to move is dependent upon the distance between the current plan and the target plan of the move.

After a move, the element 1002 is performed again. The process 1000 is repeatedly performed until a satisfactory execution plan is determined. It should be noted that the process 1000 is performed for all moving paths, each of which starts from one particular candidate solution created at 904. For each moving path, a current best execution plan is tracked. When a better execution plan is found, it becomes the current best execution plan for the moving path. Moreover, a global current best execution plan between the moving paths is tracked as well. At any given iteration, each particle will either move towards its current best plan or the globally best plan. The probability with which a particle will move towards its current best plan is a function of time, that is p=f(t). Therefore, the probability with which a particle will move towards the globally best plan is 1−f(t).

Whether the globally best plan is satisfactory is determined by periodically checkpointing the PSO process and looking at the improvement in estimated runtime of the globally best plan versus the amount of wall-clock time since the last checkpoint. When the globally best plan stops improving at a sufficient rate, the current globally best plan is deemed to be satisfactory.

To calculate the estimated cost of an execution plan, the query optimization engine factors in multiple factors, such as the throughput cost between nodes, the computer configurations and the storage drive access speed of each database node in the database system, as well as all the statistical information previously covered. The computer configurations include, for example, the configurations of the central processing units ("CPUs"), the amount of memory, and the configurations of the bus (such as computer PCI bus). Different types of bus indicate different data transmission speeds. Since the available network throughput varies between different times, it is thus dynamic. The throughput cost (also referred to herein as throughput) can be dynamically determined by a process, which is further illustrated by reference to FIG. 11.

Figure 11:
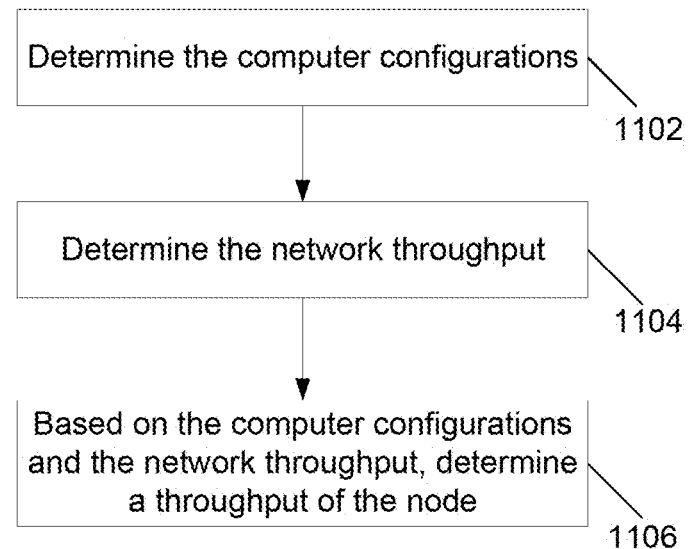
FIG. 11 is a simplified flowchart depicting a process by which a database system optimizes an SQL query based on computer configurations and network throughput in accordance with this disclosure.

Referring to FIG. 11, a flowchart illustrating a process by which a computer (such as a node) within the improved database management system determines the node's throughput is shown and generally indicated at 1100. At 1102, a computer software application running on the node determines the node's computer configurations, such as the CPU's speed, hardware cache, the amount of memory, and the bus. At 1104, the software application determines the network throughput. For example, the network throughput is the time it takes to send ten megabytes of data from the node to another particular node. At 1106, based on the computer configurations and the network throughput, the software application determines the present throughput of the node. The process 1100 can be periodically executed to determine the present throughput. Alternatively, if the maximum possible throughput of the system based on the state where there is no competition for resources is known, the currently available throughput is the maximum possible throughput minus the approximation of the currently used throughput. In a further implementation, the process 1100 is performed on each node in the database system.

Figure 12:
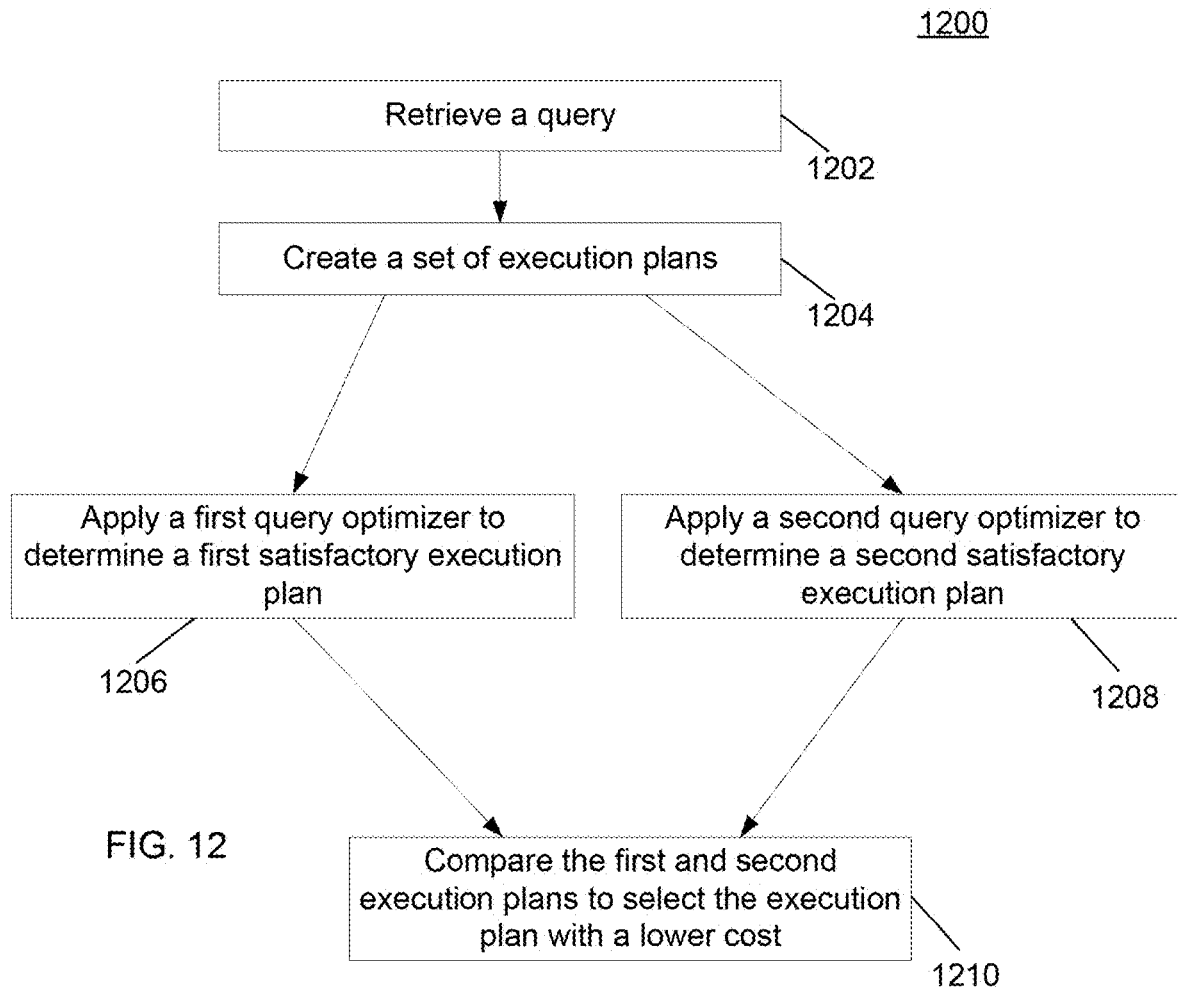
FIG. 12 is a simplified flowchart depicting a process by which a database system optimizes an SQL query using multiple query optimizers in accordance with this disclosure.

In an alternate embodiment of the present teachings, multiple query optimizers are executed to optimize a query for determining a satisfactory execution plan. The alternate embodiment is further illustrated by reference to FIG. 12. Referring to FIG. 12, a flowchart depicting a process by which a database system runs multiple query optimizers to select a desirable execution plan for a given query is shown and generally indicated at 1200. At 1202, an optimization manager of the database system receives a query. At 1204, the optimization manager creates a set (meaning one or more) of execution plans. At 1206, the optimization manager executes a first optimizer, such as that of the process 900, on the set of execution plans to determine a first satisfactory execution plan. At 1208, the optimization manager executes a second optimizer, such as a heuristic optimizer, on the set of execution plans to determine a second satisfactory execution plan. At 1210, the optimization manager compares the two determined execution plans, and selects the one execution plan with a lower cost for the query.

Figure 16:
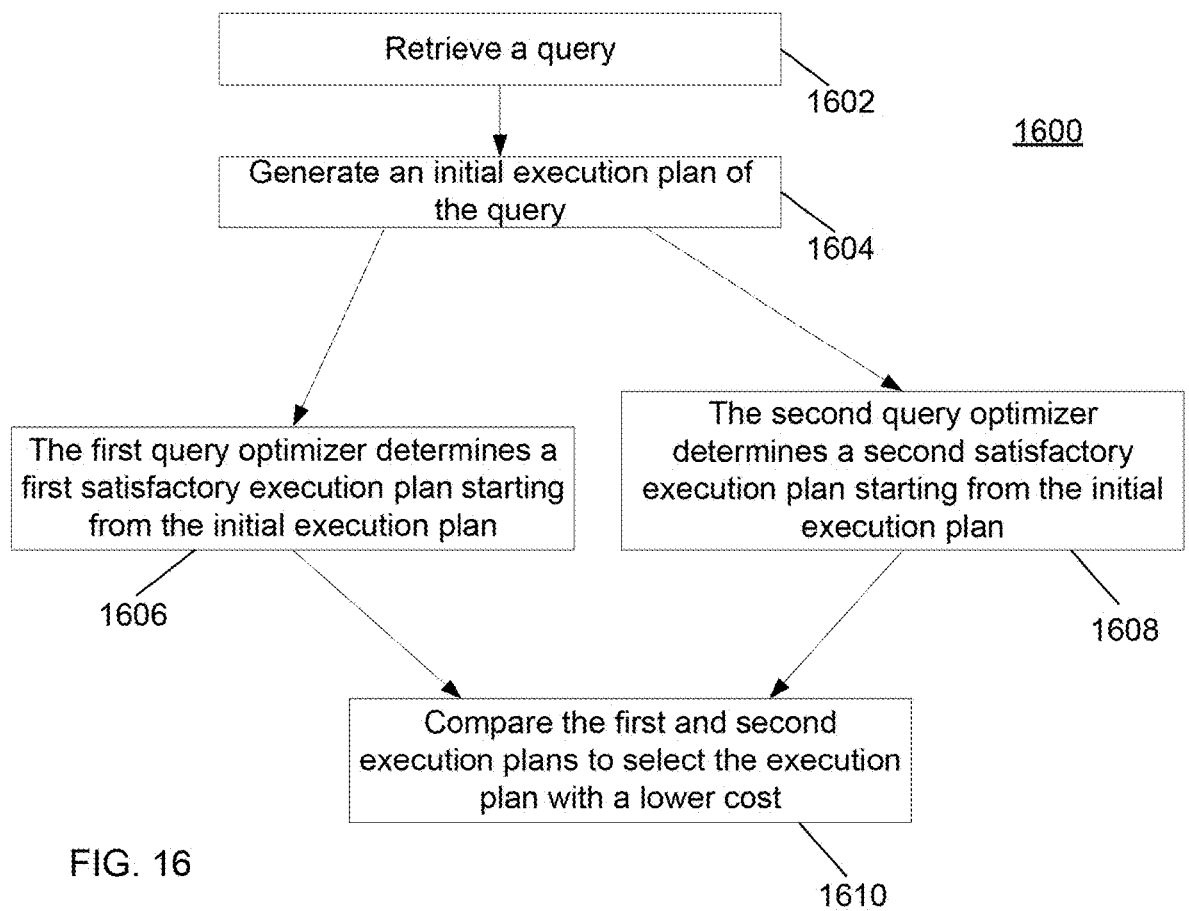
FIG. 16 is a simplified flowchart depicting a process by which a database system optimizes an SQL query using multiple query optimizers in accordance with this disclosure.

Referring now to FIG. 16, a flowchart depicting a process by which a database system runs multiple query optimizers to select a desirable execution plan for a given query is shown and generally indicated at 1600. At 1602, the database management system receives a query. The database management system includes computer software programs, such as an execution plan generator, multiple data query optimizers, etc. At 1604, the execution plan generator generates an initial execution plan of the received query. At 1606, a first query optimizer determines a first satisfactory execution plan of the query. In one implementation, the first query optimizer takes the initial execution plan as an input and generates alternative execution plans. From the alternative execution plans, it determines the execution plan with the lowest cost as the first satisfactory execution plan.

At 1608, running in parallel with the first optimizer, a second query optimizer determines a second satisfactory execution plan of the query. In one implementation, the second query optimizer takes the initial execution plan as an input and generates alternative execution plans. From the alternative execution plans, it determines the execution plan with the lowest cost as the second satisfactory execution plan. At 1610, the database management system compares the two determined execution plans, and selects the one execution plan with a lower cost for the query.

In a further implementation, the output of the first optimizer is used as the input to the second optimizer or vice versa. With two optimizers, there are thus four possible plans to choose from: the output of optimizer 1, the output of optimizer 2, the output of optimizer 1 if it is fed with the output of optimizer 2 as input, and the output of optimizer 2 if it is fed with the output of optimizer 1 as input. The framework allows for an arbitrary number of different optimizers and arbitrary chaining of optimizer inputs and outputs. The serial query optimization is further illustrated by reference to FIG. 17.

Figure 17:
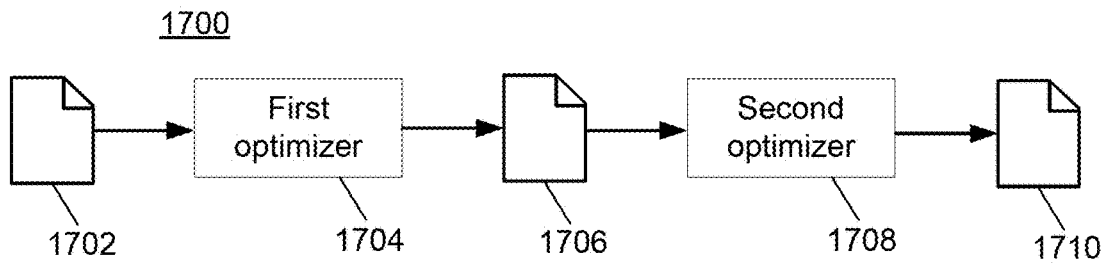
FIG. 17 is a simplified flowchart depicting a process by which a database system optimizes an SQL query using multiple query optimizers in accordance with this disclosure.

Referring to FIG. 17, a flowchart depicting a process by which the database management system optimizes query execution using multiple optimizers in sequential order is shown and generally indicated at 1700. An execution plan of a particular query is indicated at 1702. At 1704, a first data query optimizer takes the execution plan 1702 as input and determines a first satisfactory execution plan 1706 with the lowest cost. The first satisfactory execution plan 1706 is taken as input to the second optimizer 1708, which then determines a second satisfactory execution plan 1710 with the lowest cost.

Data models are useful tools to describe inherent relationships of systems of data. For instance, the relationship between two or more data variables can be depicted by one or more models. Once a model is developed based on a set of data, it can then be applied to different sets of data. Well-known data models include, for example, logistic regression models, linear regression models, nonlinear regression models, k-means, and k-nearest neighbor, etc. Some conventional database systems support stored procedures that can allow users to create and apply data models. However, such conventional data modeling technologies are presented as a black box to upper layer data operations, such as the optimizer. The conventional data models in database systems is further illustrated by reference to FIG. 13.

Referring to FIG. 13, an operation 1302 is performed on a set of data. A data model 1304 provided as stored procedures is then applied to the result of the operation 1302. Another data operation 1306 is performed on the result of the data model 1304. In such a case, the data model 1304 is a black box to the data operation 1306 and other upper layer operators. This shortcoming prevents SQL optimization and is an inefficient approach for providing desirable speed in a large database system including hundreds and even thousands of nodes and clusters and managing huge volume of data. Moreover, the conventional approach is not completely integrated with SQL statements.

The present teachings provide an improved database system integrating SQL queries with data modeling. An illustrative example of the integrated SQL queries and data modeling technologies is shown in FIG. 14. Referring now to FIG. 14, the illustrative model is a linear regression: y=ax+b. An SQL statement 1402 creates a model titled "my_model" from a set of training data. An SQL statement 1404 applies the created model on a different set of data. In one implementation, the database system implements the SQL model creation statement 1402 by evaluating SQL statement 1406 and storing the output in the system catalog. Since data modeling is completely integrated with SQL statements, not a black box to a query optimizing component, query optimization is thus possible on the data modeling. In this example, the creation and application of the data model were re-written as SQL statements. However, this is not required and is, in general, not true. All that is required is that the model creation and application can be expressed in terms of the available operators that the execution engine understands.

In contrast, the implementation of conventional data modeling in stored procedures is not known when the SQL query statements using the data models are processed. Accordingly, unlike the improved database system disclosed herein, the conventional database systems lack the capability to optimize SQL queries using data models. The deficiency of the conventional database systems is further illustrated by reference to FIG. 15.

Figure 15:
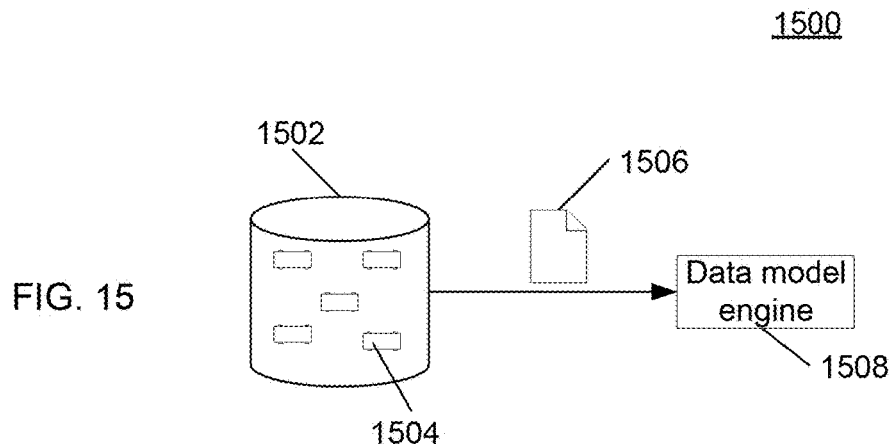
FIG. 15 is a flowchart depicting the data flow from storage drives to data models in a conventional database system in accordance with this disclosure.

Referring to FIG. 15, a flowchart illustrating the shortcomings of a conventional database system is shown and generally indicated at 1500. When a data model is created from a set of data or applied to a different set of data, a large amount of data 1506 is retrieved by a data model engine 1508. The data model engine 1508 includes stored procedures for modeling data. The data 1502 is retrieved from a large database 1502 that includes hundreds, thousands and even tens of thousands of database nodes 1504. Furthermore, the amount of the computation required for building the model on data 1502 can be extremely large. The computation time is thus costly without the benefits afforded by the optimizer of the present disclosure.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A database management system comprising:
   a processing circuit that includes a processor that operates in conjunction with a memory to create an initial execution plan of a query;
   a first query optimizer configured to be executed by the processor utilizing the initial execution plan as input to generate a first execution plan for the query; and
   a second query optimizer that is distinct from the first query optimizer, configured to be executed by the processor concurrently with execution of the first query optimizer utilizing the initial execution plan as input to generate a second execution plan for the query;
   wherein the processor is configured to select a first lowest cost execution plan from the first execution plan and the second execution plan;
   wherein the first query optimizer is further configured to be executed by the processor utilizing the first lowest cost execution plan as input to generate a third execution plan for the query, wherein the second query optimizer is further configured to be executed by the processing circuit utilizing the first lowest cost execution plan as input to generate a fourth execution plan for the query, and wherein the processing circuit is configured to select a second lowest cost execution plan from the first lowest cost execution plan, the third execution plan, and the fourth execution plan.

2. The database management system of claim 1 wherein the first execution plan is different from the second execution plan.

3. The database management system of claim 1 wherein the third execution plan is different from the fourth execution plan.

4. The database management system of claim 1, wherein the processor executes the query in accordance with the second lowest cost execution plan.

5. The database management system of claim 1, wherein the first query optimizer is configured to determine a first execution cost corresponding to the first execution plan, wherein the second query optimizer is configured to determine a second execution cost corresponding to the second execution plan, and wherein the first execution cost is compared to the second execution cost to select the first lowest cost execution plan.

6. The database management system of claim 5, wherein an execution cost of the first lowest cost execution plan is a lowest of the first execution cost and the second execution cost.

7. The database management system of claim 6, wherein the first query optimizer is configured to determine a third execution cost corresponding to the third execution plan, wherein the second query optimizer is configured to determine a fourth execution cost corresponding to the fourth execution plan, and wherein the third execution cost is compared to the fourth execution cost and to the execution cost of the first lowest cost execution plan to select the second lowest cost execution plan.

8. The database management system of claim 7, wherein the first query optimizer is configured to determine the first execution cost corresponding to the first execution plan based on at least one of: a throughput cost between a plurality of nodes in a database system associated with the database management system, or a storage drive access speed of each of the plurality of nodes in the database system.

9. The database management system of claim 8, wherein the second query optimizer is configured to determine the second execution cost corresponding to the second execution plan based on at least one of: the throughput cost between a plurality of nodes in a database system associated with the database management system, or the storage drive access speed of each of the plurality of nodes in the database system.

10. The database management system of claim 9, wherein the first query optimizer is configured to determine the third execution cost corresponding to the third execution plan based on at least one of: a throughput cost between a plurality of nodes in a database system associated with the database management system, or a storage drive access speed of each of the plurality of nodes in the database system.

11. A database management system comprising:
a memory;
a processing circuit that operates in conjunction with the memory to:
create an initial execution plan of a query;
execute a first query optimizer configured to utilize the initial execution plan as input to generate a first execution plan for the query;
execute a second query optimizer concurrently with execution of the first query optimizer to utilize the initial execution plan as input to generate determine a second execution plan for the query;
select a first lowest cost execution plan from the first execution plan and the second execution plan;
wherein the first query optimizer is further configured to utilize the first lowest cost execution plan as input to generate a third execution plan for the query;
wherein the second query optimizer is further configured to utilize the first lowest cost execution plan as input to generate a fourth execution plan for the query; and
wherein the processing circuit is configured to select a second lowest cost execution plan from the first lowest cost execution plan, the third execution plan, and the fourth execution plan.

12. The database management system of claim 11 wherein the first execution plan is different from the second execution plan.

13. The database management system of claim 11 wherein the third execution plan is different from the fourth execution plan.

14. The database management system of claim 11, wherein the processing circuit executes the query in accordance with the second lowest cost execution plan.

15. The database management system of claim 11, wherein the first query optimizer is configured to determine a first execution cost corresponding to the first execution plan, wherein the second query optimizer is configured to determine a second execution cost corresponding to the second execution plan, and wherein the first execution cost is compared to the second execution cost to select the first lowest cost execution plan.

16. The database management system of claim 15, wherein an execution cost of the first lowest cost execution plan is a lowest of the first execution cost and the second execution cost.

17. The database management system of claim 16, wherein the first query optimizer is configured to determine a third execution cost corresponding to the third execution plan, wherein the second query optimizer is configured to determine a fourth execution cost corresponding to the fourth execution plan, and wherein the third execution cost is compared to the fourth execution cost and to the execution cost of the first lowest cost execution plan to select the second lowest cost execution plan.

18. The database management system of claim 17, wherein the first query optimizer is configured to determine the first execution cost corresponding to the first execution plan based on at least one of: a throughput cost between a plurality of nodes in a database system associated with the database management system, or a storage drive access speed of each of the plurality of nodes in the database system.

19. The database management system of claim 18, wherein the second query optimizer is configured to determine the second execution cost corresponding to the second execution plan based on at least one of: the throughput cost between a plurality of nodes in a database system associated with the database management system, or the storage drive access speed of each of the plurality of nodes in the database system.

20. The database management system of claim 19, wherein the first query optimizer is configured to determine the third execution cost corresponding to the third execution plan based on at least one of: a throughput cost between a plurality of nodes in a database system associated with the database management system, or a storage drive access speed of each of the plurality of nodes in the database system.

* * * * *